Sept. 10, 1963   L. J. GEE   3,103,641
HIGH TEMPERATURE RESISTANCE THERMOMETER
Filed March 20, 1961

INVENTOR:-
LEROY J. GEE
BY
ATTORNEYS

3,103,641
HIGH TEMPERATURE RESISTANCE THERMOMETER

Leroy J. Gee, Palo Alto, Calif., assignor to American Radiator & Standard Sanitary Corporation, New York, N.Y., a corporation of Delaware
Filed Mar. 20, 1961, Ser. No. 96,793
2 Claims. (Cl. 338—28)

This invention relates to and in general has for its object the provision of a high temperature resistance thermometer, and more specifically to a probe for such a thermometer which will operate within a range of 3500–4000° F.

The need for adequate means of measuring high temperatures in an oxidizing atmosphere has existed for some time. For some applications such special methods as pyrometric devices and pneumatic probes have been utilized. However, temperature sensors having the necessary characteristics (i.e., accuracy, stability, long life, repeatability, and ease of application), although commonly available for the lower and middle-temperature regions, are presently not available for the high-temperature regions. Considerable effort has been devoted to this particular problem, especially in the area of thermoelectric methods. At least seven thermocouple combinations presently having calibrations up to 4000° F. are described in the literature. Unfortunately, however, none of these can be used in oxidizing environments. Thus, the combination of high temperatures and oxidizing atmospheres presents an obstacle that has not yet been satisfactorily overcome. Because of this lack of available thermoelectric materials that can be directly used in high-temperature oxidizing atmospheres, much effort has been expanded in developing sheaths and coatings to protect thermocouple junctions from the effects of oxidation. These efforts have not been completely successful because of the difficulty of obtaining completely gas-tight and impermeable sheaths. Where these approaches are successful, the performance characteristics of the thermocouple are usually compromised because of the necessary addition of considerable mass and size to the temperature-sensitive areas.

In addition to the requirement that a temperature probe operate within such a high temperature range, certain segments of the industry have specified that such a probe have the following characteristics:

(1) 100 hours of life at 4000° F.
    1000 hours of life at 3500° F.
(2) ±1% accuracy for the first 100 hours
    ±2% accuracy for the following 1000 hours
(3) Operating environment:
    (a) Quiescent air
    (b) $1 \times 10^{10} n/\text{cm}^2\text{-sec.}$ neutron flux
    (c) $1 \times 10^4 R/\text{hour}$ gamma flux
(4) Geometry:
    30-in. length
    <0.063 in. O.D.
(5) Thermal shock—must withstand temperature change of 1000° F./sec.
(6) Time response—2 to 3 seconds in quiescent air
(7) Signal output—at least 20 mv. at 3500° F.

Various known methods of temperature sensing are: expansion, pressure, and resistance thermometers, thermocouples; pyrometers. Expansion- and pressure-type thermometers are generally applicable to the lower temperature regions where the physical characteristics of the sensor material, such as linear expansion, volumetric expansion, or vapor pressures, are accurately known. At extremely high temperatures, the uncertainty of these physical properties and the difficulty of finding suitable material to serve either as the sensor or to contain the sensor usually eliminate these particular methods for consideration. At the other extreme, pyrometric devices are particularly applicable to high-temperature measurements but require that the source emissivity be known or that block-body conditions exist before accurate measurements can be obtained. In the present applicaiton, the geometrical limitation precludes pyrometric means. It appears then that the solution lies in either some unique thermoelectric approach or the resistance-thermometer concept. In the past decade, a major portion of the research work in the field of high-temperature sensing has been devoted to the development of suitable thermocouples, now extensively utilized.

More specifically, the object of this invention is the provision of a probe for a temperature resistance thermometer which can be made to substantially meet the specifications above set forth.

A further object of this invention is the provision of a probe of the character above described, made up of a pair of spaced electrical leads bridged by a refractory metal oxide temperature sensor and wherein the leads are coated with a first inner film of a getter material and a second outer film of a refractory oxide.

Still another object of this invention is the provision of a probe of the character above described wherein the said refractory metal oxide takes the form of beryllia, magnesia, thoria or zirconia, wherein the getter material can be a metal such as rhenium or tantalum, and wherein said electrical leads can be made of a refractory metal such as iridium.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in other forms.

Referring to the drawings.

The probe illustrated in these two figures consists of a pair of spaced, parallel electrical leads 1 and 2 conveniently made of a refractory metal such as iridium, and of semicircular cross-section. Bridging the left-hand pair of the ends of the leads 1 and 2 and electrically bonded thereto is a domed temperature sensor or tip 3 made of zirconia or other refractory metal oxide having a negative temperature coefficient of resistivity. Surrounding each of the leads 1 and 2 is a first inner film 4 of a getter material such as rhenium or tantalum and a second outer film or coating 5 of a refractory metal oxide such as thoria or beryllia.

Figure 1:
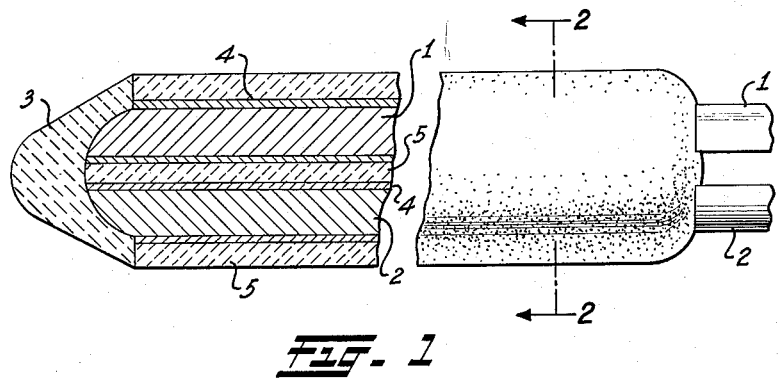
FIG. 1 is a longitudinal midsection of a high temperature resistance thermometer probe embodying the objects of my invention.
Figure 2:
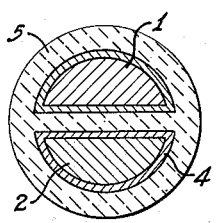
FIG. 2 is a vertical section taken on the section line 2—2 of FIG. 1.

In producing a structure of the configuration shown in FIGS. 1 and 2, iridium wire from which the leads 1 and 2 are to be made, and having an outer diameter in the order of 0.02 to 0.03 inch, are ground on one side so as to produce a wire of semi-circular cross-section such as illustrated in FIG. 2. A first and inner film of tantalum or rhenium is flame-sprayed on the leads, and then a second and outer film of beryllia or thoria in the order of 0.005 inch thick is sprayed over the getter film. Following this, the two flat surfaces of the coated leads are placed together and this assembly is flame-sprayed with a supplemental film of the same oxide previously applied to the leads. This latter and supplemental film or coating serves to bind the two leads together and also serves as a protective coating and insulator. Finally, one pair of the ends of the coated and bonded leads are flame-sprayed with zirconia so as to bridge the lead ends and form the temperature-sensing element of the probe. Although this method can be conveniently used for producing a probe of the character above described, other methods can of course be resorted to.

The refractory metal oxides above referred to have melting points and limits of usefulness in an oxidizing atmosphere indicated in the following table:

|  | Melting Point (approximate) (Degrees F.) | Limit of Usefulness in Oxidizing Atmosphere (Degrees F.) |
| --- | --- | --- |
| Beryllia (BeO) | 4,600 | 4,300 |
| Magnesia (MgO) | 5,000 | 4,300 |
| Thoria (ThO$_2$) | 5,950 | 4,850 |
| Zirconia (ZrO$_2$) | 4,700 | 4,500 |

All of these oxides are stable at high temperatures in oxidizing atmospheres, and all of them possess a negative temperature coefficient of resistance. Here it should be noted that zirconia becomes a conductor at about 3600° F., a known fact that limits its usefulness as a thermocouple protective material. However, it is this very characteristic that makes it particularly suitable as a temperature-sensitive element in a resistance type of thermometer such as herein described.

In the probe of my invention the iridium electrical leads 1 and 2 have a much lower electrical resistance than the zirconia temperature sensor or tip 3, the latter serves as the primary resistance and its value will of course be determined by the temperature being sensed. Furthermore, the dimensions of the sensor 3 can be adjusted to some extent in order to achieve the best possible combination of resistance values and time response.

Care should be taken to insure a good electrical junction between the zirconia sensor 3 and the leads 1 and 2, for any tendency to separate will introduce resistance into the measuring circuit associated with the probe and which will introduce erroneous results.

By coating the iridium leads 1 and 2 with an under coating or film of a getter material and then with an outer dense film of thoria or beryllia, the leads are protected against oxidation. Any oxidizing elements which may eventually penetrate the thoria or beryllia coating will attack the getter film. Rhenium and tantalum are particularly suitable for this purpose, for they form volatile oxides, serving as a neutral barrier around the iridium leads 1 and 2 and also have a strong tendency to further seal the outer oxide insulating film or coating.

As a result of this construction then it is possible to meet the specifications above referred to with respect to operating temperatures and environment, life, accuracy, time response, and signal output.

I claim:

1. In a high-temperature resistance thermometer: a pair of spaced refractory metal electrical leads; a temperature sensor bridging and bonded to said electrical leads, said sensor being made of a refractory metal oxide selected from the group consisting of beryllia, magnesia, thoria, and zirconia and having a negative temperature coefficient of resistivity; the electrical resistance of said leads being lower than the electrical resistance of said sensor; and said leads being coated with a first inner film of a getter material selected from the group consisting of rhenium and tantalum, and said leads being coated with a second outer film of a refractory oxide.

2. In a high-temperature resistance thermometer: a pair of closely spaced elongated, refractory metal electrical leads each of semi-circular cross-section with the flat sides of said leads being adjacent each other, and with one end of one lead terminating adjacent one end of the other lead; a domed temperature sensor bridging and bonded to said adjacent ends of said electrical leads, said sensor being made of a refractory metal oxide having a negative temperature coefficient of resistivity, the electrical resistance of said leads being lower than the electrical resistance of said sensor, each of said leads being coated completely therearound with a first inner film of getter material bonded thereto and extending from said sensor to a point substantially remote from said sensor, said leads being coated completely therearound and therebetween with a second outer film of a refractory oxide extending the length of said first inner film.

References Cited in the file of this patent

UNITED STATES PATENTS

| 822,338 | Bennett | June 5, 1906 |
| 1,613,877 | Dyckerhoff | Jan. 11, 1927 |
| 2,802,894 | Schneider | Aug. 13, 1957 |
| 2,802,925 | Von Seelen et al. | Aug. 13, 1957 |
| 2,915,575 | Thomas | Dec. 1, 1959 |

FOREIGN PATENTS

| 117,672 | Australia | Nov. 4, 1943 |

OTHER REFERENCES

Yarwood: High Vacuum Technique, 1st ed., 1943, pp. 38–49.